March 17, 1942.  H. NUTT  2,276,416
CLUTCH PLATE
Filed July 15, 1939  2 Sheets-Sheet 1
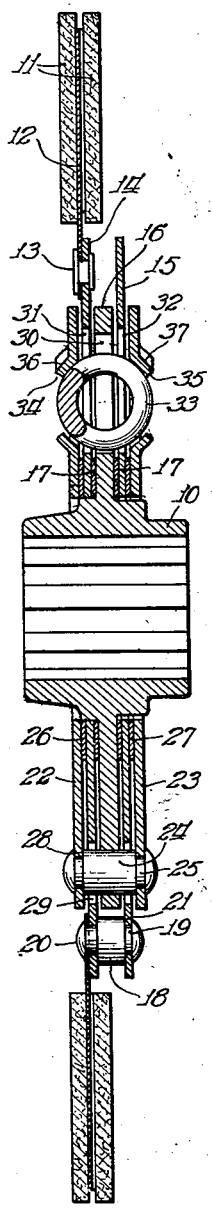
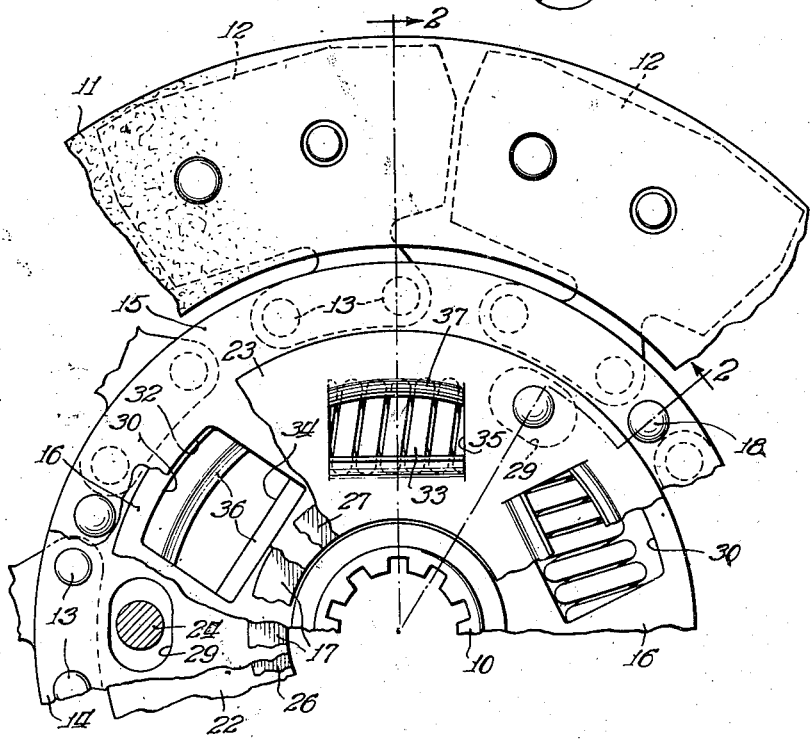
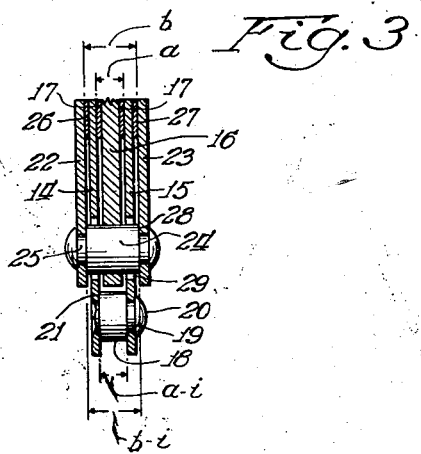
Inventor:
Harold Nutt
By: Edward C. Gritzbaugh
Atty.

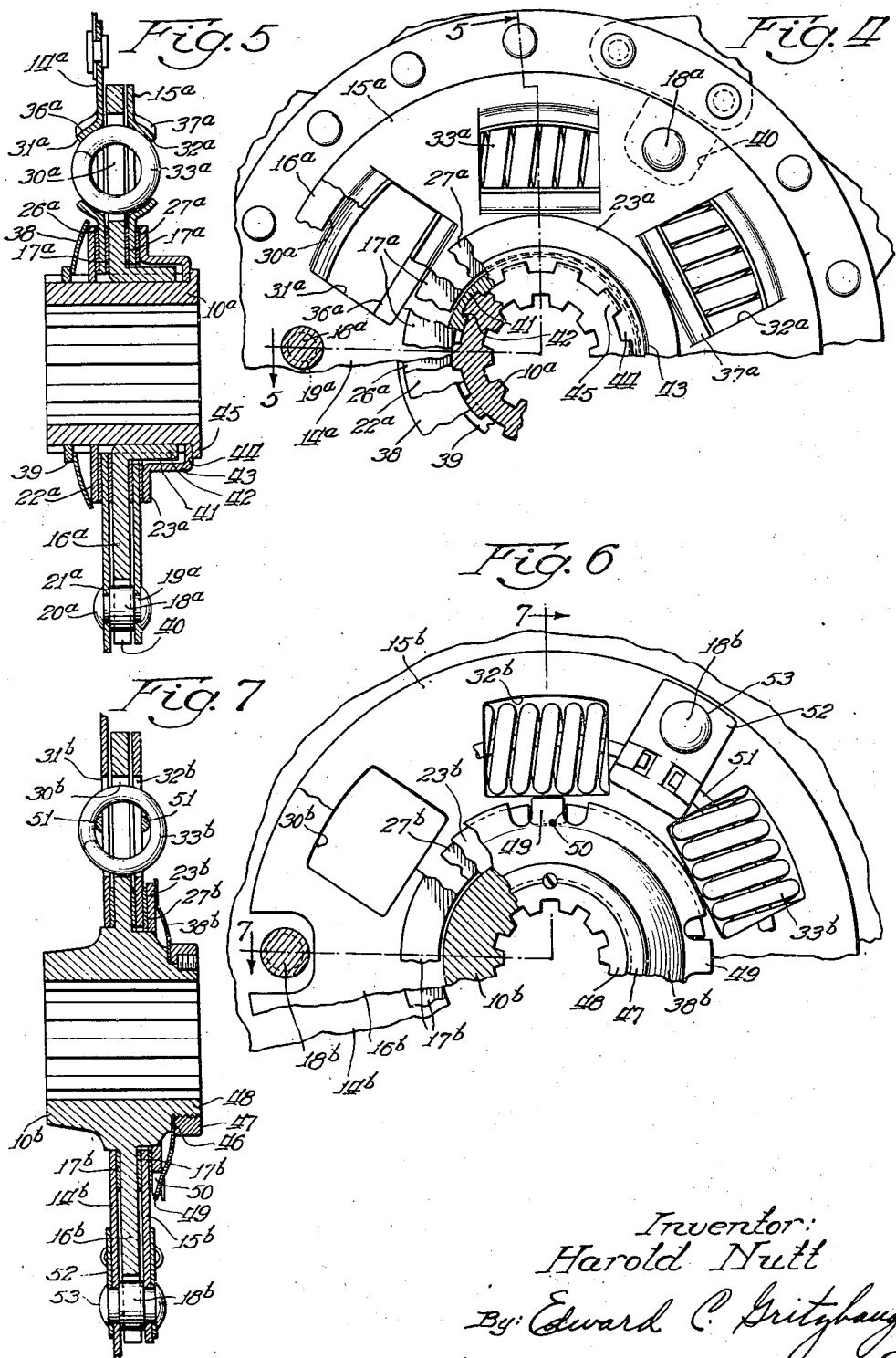

Patented Mar. 17, 1942

2,276,416

UNITED STATES PATENT OFFICE 2,276,416

CLUTCH PLATE

Harold Nutt, Chicago, Ill., assignor to Borg-Warner Corporation, Chicago, Ill., a corporation of Illinois Application July 15, 1939, Serial No. 284,607

11 Claims. (Cl. 192—68)

This invention relates to friction clutches of the type employed in automotive vehicles, and more particularly to means for yieldingly connecting the friction facing member of a friction clutch driven plate to the hub thereof so as to allow a limited amount of oscillation of the friction facing member relative to the hub under sudden heavy torque loads, and for damping such oscillation.

It has been customary in torsional vibration dampener constructions, to employ a combination of yielding cushion means such as compression springs, and frictional braking means, both interposed between the hub and the facing mounting disc, so as to attain a combination of yielding cushioning and braking action for absorbing the shock of said torque loads. The present invention details with that type of arrangement, and has as its general object to greatly improve upon the braking action of such a vibration dampener. To this end, the invention contemplates an arrangement including the conventional hub having a radial flange, annular disc members, one of which comprises the facing mounting member, embracing the flange between them through the medium of interposed friction washers, a pressure ring drivingly associated with the hub, a friction washer interposed between the pressure ring and the adjacent disc member, and means for exerting axial pressure against the pressure ring for packing the same against its associated friction washer.

The invention further deals with the problem of arranging the parts so that pressure may be secured against each of the several friction washers so that all may be equally effective in braking action. This problem while a fairly simple one where only two washers are employed, becomes considerably more complicated where the number of washers is increased. The invention contemplates the employment of as many as four separate friction washers each of which has effective braking action on both of its faces.

Another object of the invention is to provide a friction clutch torsional vibration dampener construction in which the foregoing objects are attained in a construction that is relatively simple and inexpensive.

Other objects, the advantages and uses of the invention will become more apparent after reading the following specification and claims, and after consideration of the drawings forming a part of the specification, wherein:

Fig. 1 is a fragmentary elevation of a clutch driven plate embodying the invention;

Fig. 2 is an axial sectional view taken as indicated by the line 2—2 of Fig. 1;

Fig. 3 is a detail of Fig. 2;

Fig. 4 is a fragmentary elevation of a clutch driven plate embodying a somewhat modified form of the invention;

Fig. 5 is an axial sectional view thereof taken as indicated by the line 5—5 of Fig. 4;

Fig. 6 is a fragmentary elevation of a clutch plate embodying another modification of the invention; and Fig. 7 is an axial sectional view thereof taken as indicated by the line 7—7 of Fig. 6.

As an illustration of one form in which the invention may be embodied, we have shown in Figs. 1, 2 and 3 a clutch driven plate embodying generally a hub 10 and a pair of friction facings 11 connected to the hub 10 by means of the torsional vibration dampener construction which embodies the invention.

The friction facings 11, of annular form, are secured to opposite sides of a series of thin spring metal cushions 12 which in turn are riveted at 13 to the peripheral region of the facing mounting disc 14.

The disc 14 comprises one of two annular disc members 14 and 15 embracing between them the radial flange 16 of the hub 10, a pair of friction washers 17 being interposed between the disc members 14, 15 and the flange 16.

The disc members 14 and 15 are adapted to have limited oscillation relative to the hub, and are tied together for oscillation as a unit, by means of pins 18, having reduced end portions 19 extending through the discs 14 and 15 and riveted as at 20 against the outer faces thereof. The reduced end portions 19 form shoulders 21 which determine the spacing between the disc members 14 and 15. This spacing is preferably a few thousandths less than the combined thicknesses of the flange 16 and the washers 17, so that when the pins are riveted in the disc members, the latter will be permanently distorted toward each other so as to exert pressure against the washers 17. The pins 18 are located just beyond the periphery of the flange 16.

Associated with the disc member 14 is a pressure ring 22 associated with the disc member 15 is a similar pressure ring 23. The rings 22 and 23 are each drivingly associated with the hub through the medium of pins 24 fixedly mounted in the flange 16 and having reduced end portions 25 extended through and riveted against the outer faces of the respective rings 22 and 23.

Interposed between the rings 22, 23 and the discs 14, 15 respectively are friction washers 26, 27. The shoulders 28 which are formed in the pins 24 by the reduced end regions 25, determine the spacing of the inner faces of the rings 22, 23, a few thousandths less than the combined thicknesses of the washers 17, 26, and 27, the flange 16 and the disc members 14, 15, whereby when the rings are riveted together they will impose packing pressure against the washers 26 and 27. This pressure may be sufficient, in the event that pressure is not set up by the pins 18, to pack all of the friction washers including the washers 17. In this case, the inner regions of the members 14, 15 will yield toward each other slightly under the pressure of the somewhat heavier pressure rings 22, 23.

The distortion of the discs 14 and 15 and the rings 22 and 23 under compression against their associated friction washers, is indicated in Fig 3, wherein the dimensions a and b indicate the total thicknesses respectively of the hub flange and its associated friction washers, and the total assembly of friction washers, hub flange and disc members, and wherein the dimensions a—i and b—i respectively indicate the spacing between the disc members 14—15 and the rings 22—24 respectively where they are connected by the pins 18, 24 respectively.

The pins 24 in addition to mounting the rings 22, 23, serve as stop pins for establishing positive limits to the oscillatory movement of the discs 14, 15 relative to the flange and pressure rings. To this end, the disc members 14, 15 may be provided with circumferentially elongated openings 29 through which the pins 24 extend.

The flange and disc members 16, 14, 15 are provided with substantially registering windows 30, 31 and 32 respectively in which are seated coil spring cushioning elements 33, adapted to yieldingly resist relative oscillation between the flange 16 and the disc members. The rings 22, 23 may also be provided with windows 34, 35, shrouded by flanges 36, 37, which are shaped to fit the curvature of the coil springs 33 and form a cage for each spring.

As a result of the packing pressure interposed on the inner washers 17 by the disc members 14, 15, tied together by the pins 18, and the packing pressure exerted upon the friction washer 26, 27, by the pressure rings 22, 23, rigidly associated with the flange 16 all eight surfaces of the friction washers are utilized to develop braking action between the flange 16 and rings 22, 23, on the one hand and the interposed disc members 14, 15 on the other hand.

In the form of the invention shown in Figs. 4 and 5, the flange 16a is mounted for axial sliding movement on the hub 10a so as to allow all of the braking parts including the flange 16a, the washers 17a, the disc members 14a and 15a, the washers 26a and 27a, and the pressure ring 22a, to move axially toward the ring 23a which in this case constitutes an abutment member, under packing pressure applied to the ring 22a by means of dished annular washer type spring 38. The inner periphery of the spring 38 may be engaged against a snap ring 39 seated in a groove in the hub 10a.

The disc members 14a, 15a are connected by pins 18a having reduced ends 19a riveted as at 20a in the disc members 14a, 15a. The pins 18a in this case form the stop pins, engageable with the circumferential extremities of notches 40 in the flange 16a, for limiting the oscillating movement of the disc members relative to the hub.

The flange 16a has a hub portion 41 splined as at 42 on the hub 10a so as to form a driving, axially shiftable connection between the flange and the hub. The ring 23a has a sleeve portion 43 receiving the hub portion 41 of the hub flange, and terminating in an inwardly extending flange 44 in abutting relation to an abutment flange 45 formed on the hub 10a.

In this form of the invention, as in the preferred form, the spacing between the shoulders 21a of the pins 18a may be a trifle less than the combined thicknesses of the hub flange and its associated friction washers, so as to distort the rings 14a, 15a under compression against the friction washers. The spring 38 would then serve primarily to set up compression between the two exterior washers 26a, 27a and their associated parts.

In this form of the invention, as in the preferred form, the cushioning springs 33a are seated in windows 30a, 31a, and 32a in the flange 16a and disc members 14a, 15a respectively, and serve to yieldingly resist oscillatory movement of the flange relative to the disc members. The shrouding flanges 36a, 37a may, in this case be formed in the disc members 14a, 15a instead of in the pressure rings as shown in the preferred form of the invention.

In the form of the invention shown in Figs. 6 and 7, three instead of four friction washers are employed, the friction washers 17b being interposed between the hub flange 16b and the disc members 14b, 15b respectively, and the friction washer 27b being interposed between the pressure ring 23b and the adjacent disc member 15b. In this form, as in the two preceding forms, the pins 18b connecting the disc members 14b, 15b for oscillation of the unit, serve also to set up compression between these disc members and their associated friction washers 17b. Pressure of the ring 23b against the washer 27b is developed by an annular dished spring 38b the inner peripheral region of which is secured between a shoulder 46 on the hub 10b and a retainer nut 47 threaded onto a reduced portion 48 of the hub 10b. The ring 23b is drivingly associated with the hub 10b through the medium of fingers 49 struck from the peripheral region of the spring 38b and engaged in notches 50 formed in the periphery of the ring 23b.

The cushioning springs 33b, in this form of the invention, are seated in windows 30b, 31b, and 32b in the flange 16b, and the disc members 14b, 15b respectively, and are secured in place by split rings 51 threaded between side regions of the springs and the disc members 14b and 15b respectively. The ends of the split rings 51 are secured by keeper plates 52 riveted at 53 to the respective disc members.

In operation, my improved torsional vibration dampener interposes the yielding resistance of the springs 33 and the frictional resistance of the washers 17, 26 and 27, between the hub flange 16 and the pressure rings 22, 23 on the one hand and the interposed disc members 14, 15 on the other hand. The pressure rings 22 and 23 being drivingly associated with the flange 16, to oscillate as a unit therewith, and the disc members, 14, 15 being rigidly associated through the medium of the pins 18, relative oscillation causes braking action to be transmitted between the disc members and the pressure rings through the outer friction washers, and between the disc members and the hub flange through the inner friction washers. Thus the full braking action of all four friction washers is utilized.

I claim:

1. In a friction clutch torsional vibration dampener construction, a hub having a radial flange, a pair of annular disc members, one of which comprises a facing mounting member, embracing said flange, said members being oscillatable relative to said flange and being tied together for oscillation as a unit, a ring drivingly connected to the hub and associated with one of said disc members, said flange and disc members having substantially registering windows, cushioning elements seated in said windows and yieldingly opposing relative oscillation of said members and flange, friction washers interposed between said members and said flange, and between said ring and its associated disc member, and means imposing continuous packing pressure upon said members, said ring and said friction washers for exerting a braking effect on said oscillation.

2. In a friction clutch torsional vibration dampener construction, a hub having a radial flange, a pair of annular disc members, one of which comprises a facing mounting member, embracing said flange, said members being oscillatable relative to said flange and being tied together for oscillation as a unit, a ring associated with one of said disc members and having a positive drive axially movable connection with the hub, said flange and disc members having substantially registering windows, cushioning elements seated in said windows and yieldingly opposing relative oscillation of said members and flange, friction washers interposed between said disc members and said flange and between said ring and its associated disc member, and means for exerting axial packing pressure between said flange, said disc members, said ring and said washers whereby to develop braking resistance to such oscillation.

3. In a friction clutch torsional vibration dampener construction, a hub having an integral radial flange, a ring in spaced parallel relation to said flange, having a driving connection with said hub, a pair of annular disc members, one of which constitutes a facing mounting member, associated with opposite sides of said flange, one of said members being interposed between the flange and said ring, said members and flange having registering windows, said members being oscillatable relative to said flange and ring, means tying said members together for oscillation as a unit, cushion elements seated in said windows for yieldingly resisting oscillation of said members relative to said flange and ring, means providing frictional braking surfaces in contact with each other between each of said members and said flange and between said ring and its associated member, and means for exerting packing pressure between said flange, said ring, and said members so as to render said braking surfaces operative to exert a braking effect upon such oscillation.

4. In a friction clutch torsional vibration dampener construction, a hub having a radial flange, a ring drivingly associated with said hub flange and having a portion parallel to said flange, a pair of annular disc members one of which comprises a facing mounting member, associated with opposite sides of said flange, one of said members being interposed between the flange and said ring, said members being oscillatable relative to the flange and ring, said members and flange having substantially registering windows, cushion elements seated in said windows for yieldingly opposing oscillation of said members relative to the flange, and ring, friction washers interposed between said flange and said members and between said ring and its associated member, for exerting a braking action upon such oscillation, means tying said members together for oscillation as a unit, and causing said members to exert pressure against the friction washers interposed between them and the flange, and auxiliary means exerting pressure against said ring and urging the same into engagement with its associated friction washer.

5. In a friction clutch torsional vibration dampener construction, a hub having a radial flange, a ring drivingly associated with the hub, in spaced parallel relationship to said flange, a pair of annular disc members one of which comprises a facing mounting member, associated with opposite sides of said flange, one of said members being interposed between the flange and said ring, said members being oscillatable relative to said flange and ring, said flange and members having substantially registering windows, cushion elements seated in said windows for yieldingly opposing relative oscillation of said flange and members, friction washers interposed between said flange and said members and between said ring and its associated member, for exerting a braking effect upon said oscillation, means tying said members together for oscillation as a unit, causing said members to exert pressure upon the friction washers interposed between them and the flange, and cooperating with said hub flange for limiting the oscillating movement, said ring being axially movable relative to the hub, and means exerting axial pressure against said ring for urging it into engagement with its associated friction washer.

6. A friction clutch torsional vibration dampener construction as defined in claim 4, wherein said auxiliary pressure means comprises a dished spring washer one periphery of which is engaged against said ring and the other periphery of which is in thrust transmitting association with said hub.

7. In a friction clutch torsional vibration dampener construction, a hub having a radial flange separate from and axially slidable but drivingly associated with the hub, a pressure ring drivingly associated with the hub, in spaced parallel relationship to said flange, an abutment ring in spaced parallel relationship to said flange on the other side thereof, drivingly associated with and in positive thrust engagement with said hub, a pair of annular disc members interposed between said flange and said rings, one of said disc members comprising a facing mounting member, said members being oscillatable relative to said flange and ring and being tied together for oscillation as a unit, said flange and disc members having substantially registering windows, cushion elements seated in said windows and resiliently opposing relative oscillation of the flange and members, friction washers interposed between said members and said flange and between said members and said rings, and spring means operatively interposed between the hub and said pressure ring and exerting packing pressure between said flange, said members, said rings and said friction washers.

8. In a friction clutch torsional vibration dampener construction, a hub having a radial flange, a pair of annular disc members, one of which comprises a facing mounting member, embracing said flange, said members being oscillatable relative to said flange and being tied together for oscillation as a unit, said members and flange having substantially registering windows, cushioning elements seated in said windows and yieldingly opposing relative oscillation of said members and flange, a pair of rings embracing said members and flange between them, and drivingly associated with said hub, friction washers interposed between said flange and said members and between said members and said rings, and means exerting packing pressure between said rings and the parts embraced therebetween.

9. In a friction clutch torsional vibration dampener construction, a hub having a radial flange, a pair of annular disc members, one of which comprises a facing mounting member, embracing said flange, said members being oscillatable relative to said flange and being tied together for oscillation as a unit, said members and flange having substantially registering windows, cushioning elements seated in said windows and yieldingly opposing relative oscillation of said members and flange, a pair of rings embracing said members and flange between them, and drivingly associated with said hub, friction washers interposed between said flange and said members and between said members and said rings, means tying said disc members together for oscillation as a unit and urging said members under pressure into engagement with the washers interposed between them and the flange and means tying said rings together for oscillation as a unit and urging said rings under pressure into engagement with the friction washers interposed between them and said members.

10. A friction clutch torsional vibration dampener as defined in claim 3, wherein said ring has a positive drive axially movable connection with said hub.

11. In a friction clutch torsional vibration dampener construction, a hub having a radial flange, a ring drivingly associated with said hub and having a portion parallel to said flange, a pair of annular disc members one of which comprises a facing mounting member, associated with opposite sides of said flange, one of said members being interposed between the flange and said ring, said members being oscillatable relative to the flange and ring, said members and flange having substantially registering windows, cushion elements seated in said windows for yieldingly opposing oscillation of said members relative to the flange and ring, means providing interengaging friction braking surfaces between each of said members and said flange and between said ring and its associated member, for exerting a braking action upon such oscillation, means tying said members together for oscillation as a unit and causing said friction surfaces between said members and flange to engage each other under pressure, and auxiliary means exerting pressure against said ring and causing the friction surfaces between said ring and its associated disc member to engage each other under pressure.

HAROLD NUTT.